United States Patent [19]

Modrey

[11] Patent Number: 5,005,940

[45] Date of Patent: Apr. 9, 1991

[54] CONNECTOR FOR OPTICAL FIBERS AND THE LIKE

[76] Inventor: Henry J. Modrey, 3546 S. Ocean Blvd., #720, Palm Beach, Fla. 33480

[21] Appl. No.: 535,372

[22] Filed: Jun. 5, 1990

Related U.S. Application Data

[62] Division of Ser. No. 317,208, Feb. 21, 1989, Pat. No. 4,948,224.

[51] Int. Cl.$^5$ .............................................. G02B 6/38
[52] U.S. Cl. .............................. 350/96.21; 350/96.20
[58] Field of Search .......................... 350/96.21, 96.20; 439/816, 835, 840, 841

[56] References Cited

U.S. PATENT DOCUMENTS

| | | | |
|---|---|---|---|
| 4,087,157 | 5/1978 | Hodges | 350/96.21 |
| 4,149,771 | 4/1979 | Epworth et al. | 350/96.21 |
| 4,541,685 | 9/1985 | Anderson | 350/96.20 |
| 4,652,075 | 3/1987 | de Villemeur | 439/840 |
| 4,948,224 | 8/1990 | Modry | 350/96.20 |

*Primary Examiner*—John D. Lee
*Assistant Examiner*—Phan T. Heartney
*Attorney, Agent, or Firm*—Malin, Haley, McHale, DiMaggio & Crosby

[57] ABSTRACT

A spirally wound resilient cylindrical or tubular connecting element adapted to connect or terminate pressure sensitive or brittle elongated conducting elements in either supporting or end-to-end conductive relationship. In one embodiment, the connecting element is comprised of a generally resilient cylindrical member having a hollow internal passageway therethrough adapted to receive said conducting elements in end-to-end relationship, said cylindrical member having integrally associated therewith a second, smaller, cylindrical member defining a second hollow passageway therethrough, said second hollow passageway adapted to receive an expansion strand or rip wire, said expansion strand having an outside diameter slightly larger than the internal diameter of said second hollow cylindrical passageway, wherein when said expansion strand is disposed within said second hollow cylindrical passageway the internal diameter of said first hollow cylindrical passageway is expanded beyond its equilibrium diameter. When said expansion strand is removed from said second hollow cylindrical passageway, the inherent resiliency of said connecting element urges said connecting element to grip the conducting strand or strands about their outer periphery with a generally equally directed radial force, thereby holding said conductive strands in firm coaxial alignment without disturbing the conductive material of the strand or strands.

7 Claims, 3 Drawing Sheets

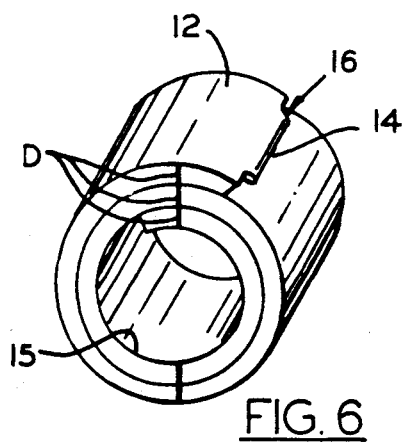
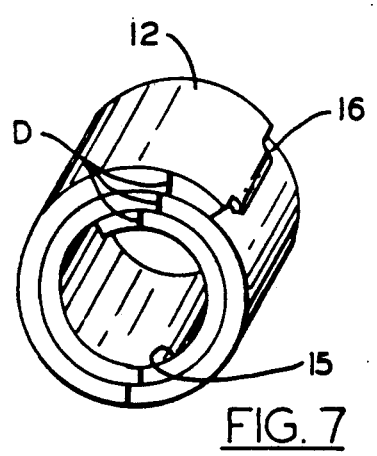
FIG. 6     FIG. 7
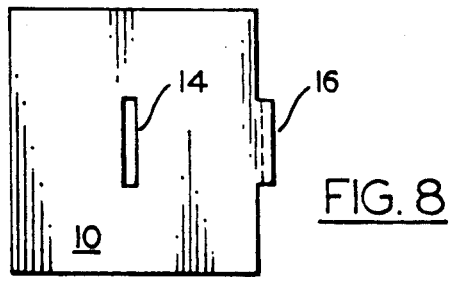
FIG. 8
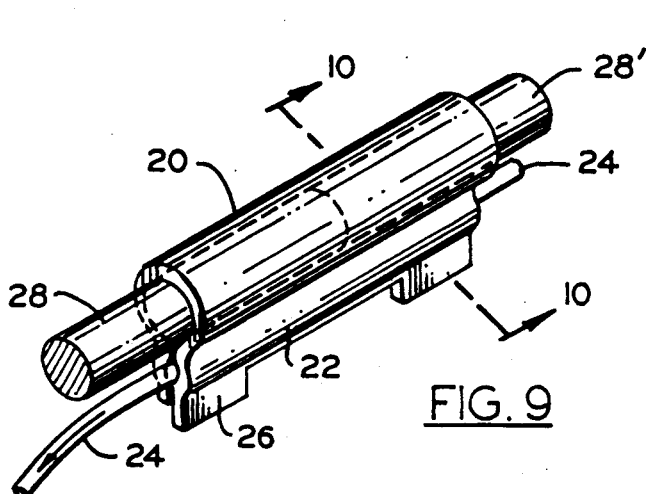
FIG. 9
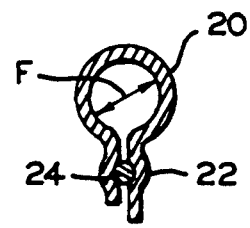
FIG. 10
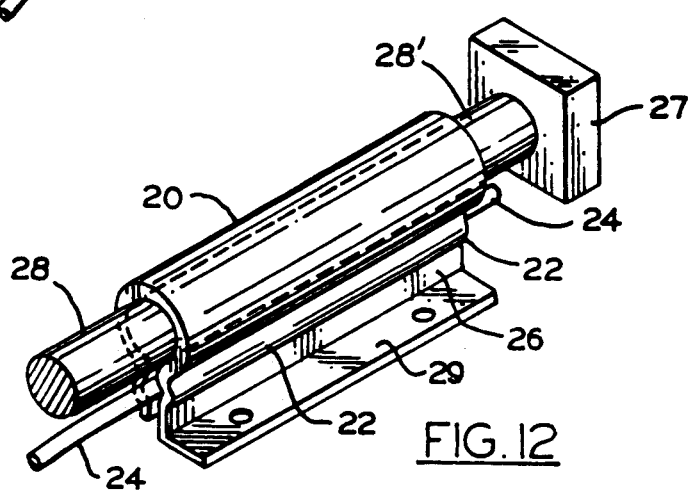
FIG. 12
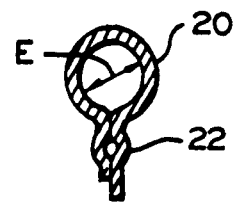
FIG. 11

CONNECTOR FOR OPTICAL FIBERS AND THE LIKE

This application is a division of application Ser. No. 07/317,208, filed 21 Feb., 1989 (Patent No. 4,948,224).

BACKGROUND OF THE INVENTION

1. Field of the Invention

The invention relates generally to the art of connecting or terminating pressure-sensitive or brittle elongated conducting elements such as optical fiber strands, or elements made from ceramic oxides or glass, plastic or paper. It may serve as a splice, terminal or guide for such conducting elements which cannot be readily used with connecting devices used for metallic wires.

2. Basis of the Invention

The invention consists basically of a springy-wound cylindrical or tubular connecting element rolled to a diameter smaller than that of the conducting element with which it is used, but opened up in the production process to a diameter slightly larger than that of the conducting element, allowing insertion of the latter therein Said connecting element is prevented from recoiling from this enlarged configuration by a retaining or locking means. Once said retaining means is removed or opened, the expanded tubular element contracts over the conducting elements which have been introduced into the ends of the connecting element, said element in the process exerting its inherent residual recoil energy about the inserted end portions of said conducting elements to retain same relative to each other.

The invention is carried out in a 3-step process, of which the first two steps concern manufacture and the third the release of the retaining means. The invention consists essentially of a connector, pre-tensioned in manufacture, and released in the third or installation step. The third step utilizes the residual recoil action of the springy connecting tube element This recoil energy is a function of the dimensions and, of course, the properties (i.e.: springiness) of the tube material. It can be engineered into the design of a connector with the precision of a pressure gauge, ranging from a slight circumferential touch being exerted on the connected end portions of the conducting elements to substantial and evenly distributed pressure thereover.

CHANGES IN CONDUCTOR TECHNOLOGY

There exists an enormous technology for connecting or terminating metallic electrical conductors, based on metallic interaction (soldering or welding), or by the deformation of a metallic sleeve on the conductor (crimping) or by pressure of a screw on a wire. Traditional connector technology is not applicable to the new types of signal conductors which have developed, such as optical fiber strands. Due to the nature of these new conductors, the existing metallic connecting technology is largely useless.

Neither fiber strands for optical transmission nor superconductive oxide cables are simply the eguivalent of metallic wires, largely because the auxiliary connecting devices therefore require deformation of the connected elements, whereas in the state-of-the-art technologies, deformation of conducting members will impair or destroy conductive properties. The general rule is that optical fiber strands should be used at their full uncut length, which represents a serious restraint on the new technology, which would benefit from splicing and connecting techniques as much as did the metallic wire technology. There exists tens of thousands of wire connecting devices in the prior art, but there are only a few isolated devices for connecting fiber strands Optical fibers have important advantages over metallic wires. However, fiber optic connector technology is deficient in the auxiliary devices which were largely responsible for the enormous growth of electrical technology. Metallic wires can be simply connected by twisting, soldering, crimping and by screw-operated terminals. These connecting means have provided the limitless capacity to connect electrical devices conveniently and inexpensively which has been the cornerstone of a century of development in the electronics industries.

However, the use of copper wires in electrical devices is diminishing. Printed circuits and circuit chips are fundamentally reducing requirements for wired connections. Optical fiber technology has now successfully entered some of the most important fields of wired connections such as telephones and cables. Another new field, now discernible in its early stages, involves the technique of superconductivity which now relies on the use of ceramic metallic oxides of extreme brittleness (the so-called "Zurich" oxides). To connect splice or guide such superconductors virtually none of the means presently used in metallic wire technology are applicable.

It follows that in the present state of the art, only devices specifically designed for the splicing of optical fiber strands or of brittle or pressure-sensitive conductors can be considered as applicable prior art, such as U.S. Pat. Nos. 4,541,685 (Anderson/A.T.&T. and Bell Labs); 4,580,874 (Winter/Olin); and 4,676,588 (Bowen/AMP, Inc.).

It is submitted that an effective splicing method, inexpensive and suitable for .incorporation with high-speed production technology, would represent an important advance and may be expected to secure an important position in the new fields of fiber optics and superconductivity. The instant invention proposes a means for connecting and/or holding the aforementioned members, for example, in face-to-face contact of the abutted ends of two co-linear conductive fiber members, thereby facilitating high-speed production and information technology.

OBJECTS OF THE INVENTION

It is a principal object of the present invention to provide a means for connecting the end portions of elongated strands of optical fibers or superconductive cable in operative engagement firmly with a controlled and predictable uniform radial force being exerted on the peripheral surface of said end portions of said cables.

It is another principal object of the present invention to provide a means for connecting optical fiber, superconductive cable or other elongated members in end-to-end engagement.

It is another principal object of the present invention to provide a means for terminating, guiding and holding optical fibers or other elongated conductive members.

It is a further object of the present invention to provide a novel means for connecting fiber optic, superconductive or other conductive members with a springy clamping pressure which is distributed substantially over one-half of the entire outer peripheral surface of the conductive member, which clamping pressure can be accurately predetermined.

It is a still further principal object of the present invention to provide connections or terminals as aforesaid which can be manufactured and installed using already known high speed production methods.

Another object of the instant invention is to provide a means for connecting elongated strands of fiber optic or super-conductive cable in operative engagement firmly, with the generally uniform radial force being exerted about the peripheral surface of said cable.

It is another object of the instant invention to provide a means for connecting fiber optic, super-conductive or other elongated conducting members in end-to-end engagement which connector can be manufactured using a high-speed mass production technology already known.

SUMMARY OF THE INVENTION

The invention comprises a means for coupling two elongated, non-metallic, signal or power transmitting elements in functional engagement As revealed in the prior art, the presently used spirally round springy pins operate on the principle whereby the rolled pin contracts when pressed into a hole of slightly larger diameter than the outside diameter of said pin. A conductive or other cable member inserted into said pin prior to said pin being pressed into said hole is grasped by a generally uniformly directed radial compressive force between the inner surface of said pin and the outer surface of said conductive member. In the present invention, however, the connecting means is placed into an expanded state during production and is temporarily held in this expanded configuration resulting in an enlarged internal diameter. Said internal diameter thereafter receives a pair of end segments, one into each end of said pin, of the cables to be connected in end-to-end engagement. Once this end-to-end engagement is achieved, the temporary enlarging hold on the pin is released by either vibration, mechanical release or other means to allow the pin connector to return by its inherent spring force toward its original diameter and configuration. In doing so, it closes over and grips the inserted fiber strands in splicing relationship creating a conductive joint.

In one embodiment of the invention, the connecting means itself is comprised of a spirally round sheet of planar metallic material wherein the outer end of said round pin has disposed therein at about midway along the length thereof an inwardly bent rigid tongue member sized and shaped to be received by a corresponding slot disposed in the next lower layer of said spirally round pin.

The pin itself is manufactured such that in order to insert the tongue into the slot, the pin will have to be slightly unwound out of its relaxed state, thereby increasing the inside diameter of said pin. The pin will be held statically in that enlarged position until the tongue is removed from the slot, at which time the pin will resume its natural configuration. If a pair of cable members are inserted, one into each end of said pin, while said pin is in the expanded or preloaded (tongue in slot) position, said cable members will be firmly gripped and held in relation to each other once the tongue is removed from the slot and the pin has moved back towards its natural position so long as the cable members are of an outside diameter greater than or equal to the inside diameter of said pin in its relaxed, natural configuration.

The small inwardly bent tongue member means and the corresponding slot means are both formed in the manufacturing process. As further part of the manufacturing process, the connector is expanded, say by the insertion of expansion means in the shape of cones into both open ends. This increases the diameter of the rolled connector until the tongue becomes engaged by the slot.

To splice fiber strands of suitable diameter, they are inserted into the connector until they meet in face-to-face contact. The kinetic energy stored in the preloaded connector is now released by means of a vibrating or tapping tool or by lifting a bent-up corner of the connector pin by means of a pointed tool.

It will be evident that this splicing technique is suitable for large-scale rapid production methods as well as for short-run manufacture, and is suitable within the new field of fiber optics technology in its entirety, from laboratory and prototype wiring and repair work to huge telephone, cable and computer installations, as well as superconductive strands.

The required production technology for rolled pins has existed for a considerable time and can be adapted to form said tongue and slot into the unrolled pin blank and to open up the rolled pin and thereby pre-load the pin within the same operation. The connector material should have a coefficient of thermal expansion (CTE) suitable to survive and function within temperature ranges of superconductors in the form of electrical power transmission cables.

A second embodiment of the present invention is comprised of a generally elongated cylindrical sleeve member adapted to receive respective end portions of conductive cable or fiber to be spliced, said cylindrical member having elastic properties comparable to the first embodiment discussed above, said cylindrical member having a second parallel bifurcated cylindrical member integrally connected thereto adapted to receive an expansion strand member means, said expansion strand member means having an outside diameter larger than the inside diameter of the bifurcated cylindrical member in its relaxed state. Therefore, when said expansion strand member means is inserted within the bifurcated cylindrical member, the inside diameter of the first cylindrical member is increased slightly to a configuration for receiving the respective end portions of the conductive strands to be spliced. Upon removal of said expansion strand member means, the elastic properties of said connecting cylinder cause said cylinder to close about the end portions of said conductive strands in a generally uniformly directed inward radial force. The expansion strand member means may be comprised simply of an elongated wire or by a modified wire having a pull tab integrally connected thereto.

A wedge shaped expansion member means may be used in replacement of said enlarging strand in which case said bifurcated cylindrical member would be replaced by a bifurcated channel corresponding generally to the contour of the wedge shape of said expansion member means.

An additional embodiment of the present invention is comprised of the cylindrical member for holding said conductive strands in conductive engagement, said cylindrical member having integrally connected thereto a series of intersecting finger-like members terminating so as to form a series of parallel diamond-shaped openings along a line running parallel to the elongate axis of the cylindrical connector nd spaced therefrom. A correspondingly diamond-shaped key means is disposed through said diamond-shaped openings. The cross-section of said diamond-shaped key means is substantially taller than it is wide whereby when said key means is disposed generally vertically, the opposed finger members are allowed to relax with respect to one another, thereby increasing the internal diameter of said cylindrical connecting member and allowing the free insertion of the respective end segments of the conductive members to be spliced. Rotating said key means through ninety degrees moves said key means into a horizontal position forcing said finger members to separate from each other which in turn causes said internal diameter of said cylindrical connecting member to decrease and grasp the end portions of said conductive strands due to the elastic properties of said connecting members. It should be noted that for purposes of this disclosure, "vertical" position of said key means refers to the height of said key means in cross-section being substantially greater than the width thereof, and "horizontal" position of said key means refers to the cross-section of said key means being substantially wider from left to right than its height in said horizontal position. electrical power transmission cables.

BRIEF DESCRIPTION OF THE DRAWINGS

FIG. 6 shows a representative connecting member having exemplary notches in linear alignment at the end thereof for purposes of illustrating the relative movement of the spiral layers between the preloaded and the relaxed configurations.

FIG. 7 shows the connecting member of FIG. 6 wherein said connecting member has moved from the preloaded condition shown in FIG. 6 to the natural or clamping position of FIG. 7 as shown by the relative positions of the notches.

FIG. 8 shows the blank of the rolled pin before rolling.

FIG. 9 shows a second embodiment of the instant invention.

FIG. 10 shows a cross section taken along lines 10—10 of FIG. 9.

FIG. 11 shows a cross section taken along lines 10—10 of FIG. 9 after the enlarging strand has been removed.

FIG. 12 shows a modified second embodiment of the instant invention.

DETAILED DESCRIPTION OF THE PREFERRED EMBODIMENT

Figure 5:
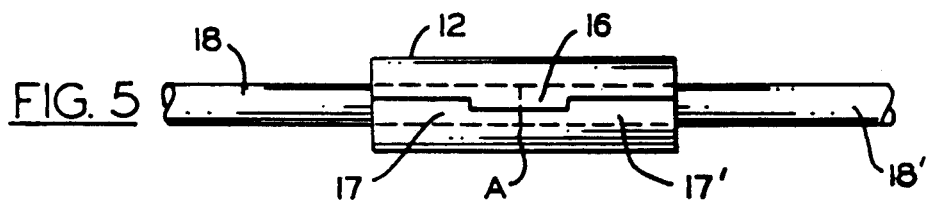
FIG. 5 shows an elevational view of the connecting member holding a pair of elongated conductive strands (in phantom) firmly in operable engagement.

As best shown in FIGS. 5 and 8, the instant invention 10 is directed toward connecting two conducting fiberous elements 18 and 18' in end-to-end conductive relationship comprised of a piece of flat spring metal 10 rolled into a spiral connecting element or splice means 12 having an inwardly bent tongue member means 16 integrally connected to its outermost end. Said tongue member means 16 is sized and shaped to snap-fit into a corresponding slot means 14 which is disposed in generally closely offset association with said tongue member means 16.

Connecting means 12 is preferably a spirally wound springy connecting pin member defining a hollow cylindrical volume 13 therewithin adapted to receive the end segments 17 and 17' of fibrous conducting members 18 and 18', respectively, so as to form a conductive joint A (shown in FIG. 5).

Figure 2:
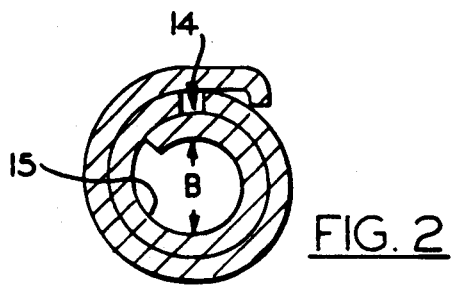
FIG. 2 shows a cross section of the pin of the instant invention taken along lines 2—2 of FIG. 1.

FIG. 2 shows connecting means 12 in its relaxed, natural state. It can be seen that tongue member 16 is not in alignment with slot 14 in this configuration, and cylindrical volume 13 assumes generally the cross sectional dimension indicated by reference letter B, which is preferably slightly less than the cross sectional dimension of end segments 17 and 17'.

Figure 1:
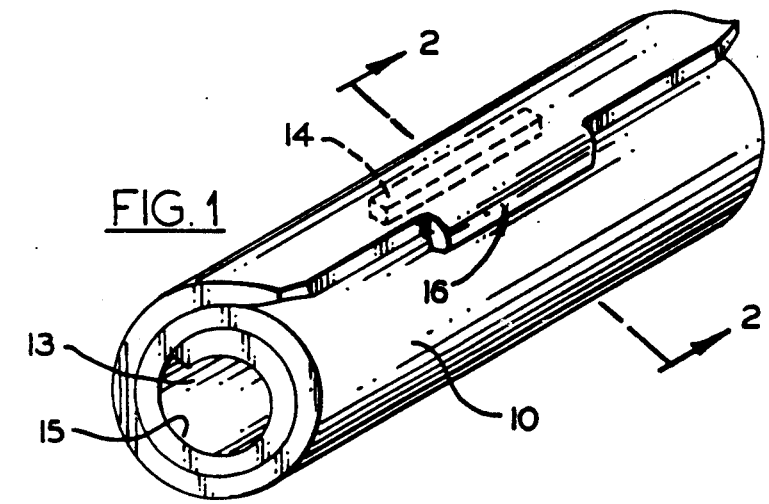
FIG. 1 shows a perspective view of the rolled pin in its relaxed, natural state showing the tongue-receiving slot in phantom.
Figure 4:
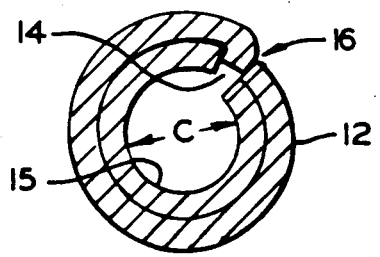
FIG. 4 shows the pin of the instant invention taken along lines 4—4 of FIG. 3.
Figure 3:
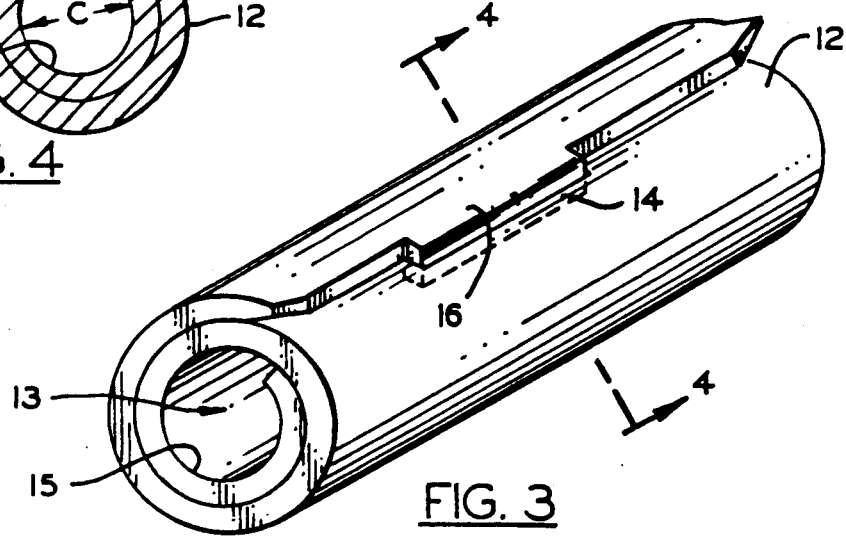
FIG. 3 shows a perspective view of the pin of the instant invention in its pre-loaded or partially expanded state with said tongue-receiving slot show in phantom.

As best seen in FIGS. 3 and 4, the only way to insert tongue member means 16 into slot means 14 is to partially unwind connecting means 12 against its inherent tendency to remain in the state shown in FIGS. 1 and 2. In this partly unwound state, shown in FIG. 4, cylindrical volume 18 assumes generally the cross sectional diameter indicated by reference letter C, which is slightly larger than the diameter indicated by letter B in FIG. 2. In the position shown in FIGS. 3 and 4, connecting element 12 has a built-in tendency to move toward the configuration shown in FIGS. 1 and 2 but is refrained from doing so by the interaction of tongue member means 16 with slot means 14. Connecting member 12 is preferably placed into the unwound or preset configuration shown in FIGS. 3 and 4.

When connecting element 12 is in the configuration shown in FIGS. 3 and 4, end segments 17 and 17' of conductive fibrous members 18 and 18', respectively, are inserted into the cylindrical volume 13 from opposite ends of member 12, which volume 13 acts as a through opening within connecting element 12. End segments 17 and 17' are abutted together in operable, coaxial engagement to form conductive joint A shown in FIG. 5. Thereafter tongue member means 16 is caused to be removed from slot means 14, as by vibration, direct mechanical contact or other process which causes tongue member 16 to be released from engagement with slot means 14. Once this occurs, connecting element 12, by virtue of the potential energy owing to its inherent spring-like resilient nature, will move toward its equilibrium state shown in FIGS. 1 and 2. As the spirally wound connecting element 12 moves from its held-open position toward its equilibrium, closed or splicing position, the inner diameter thereof will change from diameter C toward diameter B until the interior surface 15 of volume 13 will come into firm engagement with the outer surfaces of strands 18 and 18', holding them in firm engagement relative to each other.

It should be noted that the cross sectional diameter of strands 18 and 18' should be at least slightly larger than the internal cross sectional diameter B of cylindrical volume 13 as seen in the configuration of FIGS. 1 and 2. It should also be noted that when connecting means 12 is in the configuration shown in FIGS. 3 and 4, internal diameter C must be at least slightly larger than or the same size as the cross sectional outside diameter of strands 18 and 18' and likewise of end segments 17 and 17'.

As can be seen from FIGS. 6 and 7, the wound layers of connecting element 12 move relative to one another when moving from the held-open position of FIGS. 3, 4 and 6 to the closed or splicing position of FIGS. 1, 2 or 7. To illustrate this, demarcations indicated by reference letter D placed on an end of connecting member 12 are shown to be aligned in FIG. 6 yet displaced from one another in FIG. 7.

FIG. 8 shows the rolling blank of the spirally wound pin 12 prior to rolling. Said pin may be rolled by any appropriate method, most of which are well known in the art.

FIGS. 9-11 show an alternative or second embodiment of the instant invention wherein fibrous conductive strands may be spliced end-to-end in cylindrical connecting member 20. Connecting member 20 is preferably comprised of resilient material having elastic properties commensurate with the material of the above disclosed embodiment which urge said connecting member 20 to assume the position shown in FIG. 11 in its equilibrium state. As best shown in FIGS. 10 and 11, a second, smaller, bifurcated cylindrical expansion member means 22 is integrally connected to connecting member 20 wherein when expansion strand 24 is wedged into the interior of expansion cylinder member means 22, the connecting member 20 is caused to assume an enlarged internal diameter F. When said strand 24 is removed, connecting member 20 assumes the decreased cross sectional diameter E, as shown in FIG. 11, adapted to grip fibrous conductive strands 28 and 28' respectively. Leg means 26 may be provided in association therewith for connecting the apparatus to the carrier member, such as a printed circuit board.

As in all embodiments described herein, the operation of the invention is comprised of the steps of providing a resilient generally elongated cylindrical connecting member having an expandable inner diameter, inserting the end segments of two conductive fibrous strands to be connected in end-to-end contact into the expanded diameter of said connecting member, and thereafter removing a biasing or expansioning means therefrom so that the inner diameter of said elongated connecting member decreases due to the inherent resiliency thereof, wherein said connecting member clamps about the end portions of the conductive strands being spliced in tight splicing engagement.

In a third embodiment of the instant invention, shown in FIG. 12, the structure has been modified by the addition of an elongated flange plate means 29 for securing connecting member 20 to a carrier member (not shown), such as a printed circuit board. In the configuration shown in FIG. 12, connecting member 20 is utilized to retain fibrous conducting strand member 28' in registry with fiber optic connector 27. Expansion member 24 is shown in its yet to be removed position within cylindrical expansion member 22. Expansion strand 24 may be made of a low melting point material whereupon modest heating thereof results in its disintegration and consequent clamping of connecting member 20 about strands 28 and 28'.

Figure 13:
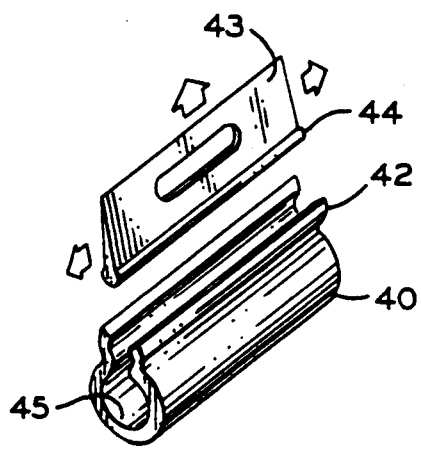
FIG. 13 shows a third embodiment of the instant invention.

A fourth embodiment is shown in FIG. 13 wherein expansion body member 44 has connected thereto a gripping means 43 to facilitate the removal of said expansion member 44. Connecting member 40 has integrally connected thereto an elongated generally smaller expansion cylinder 42 adapted to receive expansion body member 44. Upon insertion of member 44 into cylinder 42, connecting member 40, and in particular the internal volume 45 thereof, is caused to expand to receive the end portions of fibrous conductive strands for splicing as described elsewhere in this disclosure. Upon insertion of said conductive strands into volume 45, one simply removes strand 44 by pulling on gripping means 43 in any of the directions indicated by arrows in FIG. 13. Removal of strand 44 from cylinder 42 causes member 40, as a result of its inherent resiliency, to assume a reduced cross sectional diameter, thereby clasping or splicing the fibrous conductive strands disposed therein.

Figure 14:
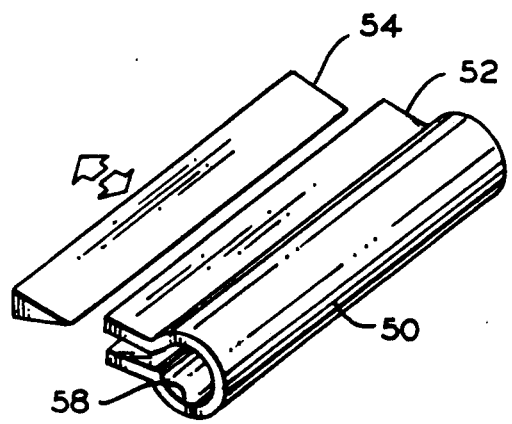
FIG. 14 shows a fourth embodiment of the instant invention.

A fifth embodiment is disclosed in FIG. 14 comprised of a connecting member 50 having a wedge shaped expansion member 54 adapted to be received by expansion receiving portion 52. It should be noted that expansion wedge 54 may be solenoid operated for manually reciprocating during a mass production process wherein a plurality of said connecting members 50 are moved into relative association with reciprocating wedge member 54 one after the other. As each connecting member 50 is brought into association therewith, wedge member 54 is extended outwardly into the wedge receiving portion 52, thereby expanding the internal diameter 58 of connecting member 50 to enable insertion of fibrous connecting strand end portions 18 and 18' respectively, whereupon removal of wedge member 54 causes connecting member body 50 to contract in clamping engagement about the outer surfaces of said fibrous strand end portions 18 and 18'.

Figure 15:
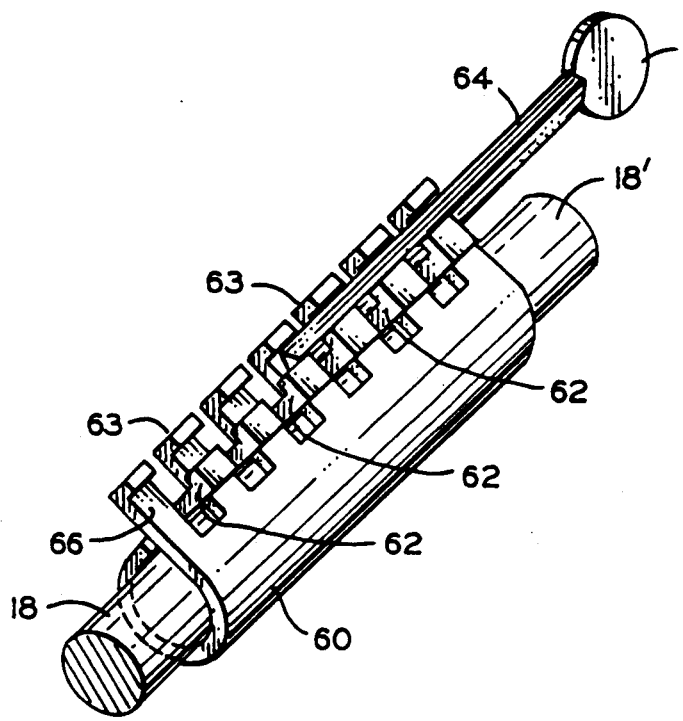
FIG. 15 shows a fifth embodiment of the instant invention.
Figure 16:
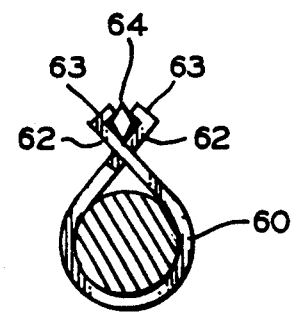
FIG. 16 shows a cross section taken along lines 16—16 of FIG. 15.
Figure 17:
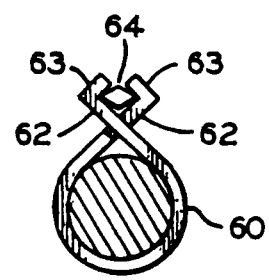
FIG. 17 shows a cross section taken along lines 16—16 of FIG. 15 after said key means has been rotated through ninety degrees of rotation.

In the sixth and final embodiment hereof, cylindrical connecting member 60 has integrally connected thereto a series of alternating, opposed, finger members 62 having inwardly directed retaining projections 63 thereon defining a generally diamond-shaped channel 66 therethrough. Elongated key member 64 is diamond-shaped in cross-section and is adapted to be received within diamond-shaped channel 66 in interfitting engagement. Expansion key 84 is preferrably provided with a gripping pad 69 at one end to facilitate the rotation thereof, as best shown in FIGS. 16 and 17. The cross sectional configuration of key means 64 is that of an elongated diamond. Rotating key means 64 using gripping pad 69 through ninety degrees of rotation causes the internal cross sectional diameter G of connecting member 60 to either be expanded or reduced depending upon the original position of key means 64 within channel 66. It is to be appreciated that in the embodiment shown in FIGS. 15 through 17, the expansion member 64 need not be removed from its association with connecting member 60, thereby allowing for the possibility of successive removal or reinsertion of the conductive strand 18 or 18' or fibrous strand end portions 17 and 17' and replacement with other conductive strand members.

The invention therefore generally comprises a resilient cylindrical member having a predetermined equilibrium or second diameter, which diameter is movable therefrom to an expanded or second diameter, or in other words, between a closed position and an open position by means of some releaseable expansion step. The internal diameter of the cylindrical gripping member in its closed position should be slightly smaller than the external or surface diameter of the fibrous conductive strand or strands being gripped. The internal diameter of the connecting member in its open, or first, configuration is slightly larger than the outside diameter of the conductive fibrous strand to be gripped. Said connecting member grips the fibrous conductive strand when the connecting member body is brought from the open, or first, to the closed, splicing or second position.

It should be noted that the connectors described herein may be used to support or otherwise grasp a single elongated conductive strand. The conductive strands contemplated may be constructed of any conductive material.

The instant invention has been shown and described herein in what it is considered to be the most practical and preferred embodiment It is recognized, however, that departures may be made therefrom within the scope of the invention and that obvious modifications will occur to a person skilled in the art.

What I claim is:

1. An article for connecting the end segments of two elongated fiber members in end-to-end engagement, comprising:
    a spirally wound springy cylindrical member comprised of a wound planar surface defining an empty cylindrical inner passageway, said cylindrical member comprising at least two partially overlapping spirally wound layers;
    a tongue member means connected to the outer end of the wound planar surface;
    said wound planar surface defining a recessed slot means therein adapted to removably receive in interfitting engagement said tongue member means;
    said cylindrical inner passageway having a first diameter when said tongue means is inserted into said slot means adapted to receive the end segments of said elongated fiber members, and a second, smaller, diameter equal to the outer diameter of the fiber members to thereby clamp the end segments of said fiber members in end-to-end engagement after said tongue means is removed from said slot means;
    said tongue member means extending radially through only the next adjacent layer of said member.

2. The article of claim 1, wherein said tongue member means is inwardly bent.

3. A connector for connecting two fiber conductors in stable end-to-end engagement, comprised of:
    a spirally wound cylindrical member having an outer surface and an elongate axis, said cylindrical member being characterized as having at least more than one overlapping spiral winds;
    said cylindrical member defining a hollow cylindrical inner volume along said elongate axis and further defining a slot therein on its outer surface adapted to receive a corresponding inwardly bent tongue member means connected to said outer surface;
    said tongue member means being adapted for movement between a first position entirely removed from said slot and a second position entirely within said slot;
    when said tongue member means is disposed within said slot, said tongue member means does not extend beyond the thickness of one wind of said member and thus does not extend into said inner volume of said member;
    whereupon when said tongue member means is disposed within said slot, said cylindrical inner passageway assumes a first, enlarged, diameter adapted to receive the end segments of said elongated fiber members and, when said tongue member means is removed from said slot means said cylindrical inner passageway assumes a second, reduced diameter generally corresponding to the diameter of the fiber members to thereby clamp the end segments thereof in end-to-end engagement.

4. A method for joining together the end portions of a pair of conductive fiber cables in end-to-end engagement, said method comprising:
    providing a pair of conductive fiber cables, each having an end portion to be spliced in end-to-end contiguous engagement;
    providing a resilient generally elongated connecting member, said connecting member defining a hollow inner passageway and having means associated therewith for retaining said internal passageway in a first, expanded, state, generally larger than the cable end portions, adapted to receive said end portions of said fiber cables for splicing;
    inserting said end portions into said expanded internal passageway of said connecting member and abutting said end portions together therewithin;
    disabling said means for retaining so that the resiliency of said connecting member causes said connecting member to assume a second configuration wherein said hollow inner passageway has a second, reduced, diameter adapted to grip the end portions of said cables in splicing contact.

5. The method of claim 4, wherein:
    said connecting member is comprised of a spirally wound resilient member having an innermost end coincident with said hollow inner passageway and an outermost end coincident with the outer surface of said connecting member;
    said means for retaining is comprised of a tab member connected to the outermost end of said wound connecting member disposed in proximity to an aperture defined by an adjacent turn of said wound connector wherein said tab means is positionable to rest entirely within and not extend beyond said aperture in a first, pre-loaded state and to be disposed entirely without said aperture in a second, clamping, state;
    said outermost end of said wound connecting member entirely overlapping said aperture when said connecting member is in said second, clamping, state.

6. A connector for connecting conductive cylindrical cables in end-to-end engagement, comprising:
    a spirally wound resilient connecting body member defining generally a cylindrical hollow interior therethrough adapted to receive end segments of conductive cables to be joined, said body member comprising at least more than one spirally wound layer;
    said connecting member having an outermost end defining an inwardly bent tab adapted to be received by an aperture defined in the next lower adjacent layer of said wound connecting member when said connecting member is in a first, pre-loaded, state wherein said aperture is adapted to receive said cylindrical conductive cables in end-to-end engagement prior to being clamped generally permanently together, said tab member further being moved to a position entirely outside of said aperture when said connecting member is in a second, clamping, position, the diameter of said hollow inner passageway of said connecting member being smaller when said connecting member is in the clamping position than when said connecting member is in the preloaded position;

the outermost end of said connecting member overlapping and covering said aperture when said connecting member is in said second, clamping, position.

7. The connector for connecting conductive cylindrical cables in end-to-end engagement, comprising:

a spirally wound resilient connecting member defining generally a cylindrical hollow interior therethrough adapted to receive end segments of conductive cables to be joined, said connecting member comprising at least more than one spirally would layers;

said connecting member having an outermost end defining an inwardly bent tab adapted to be received by an aperture defined in the next lower adjacent layer of said wound connecting member;

said connecting body member defining an inner diameter which is smaller than the outer diameter of said conductive cylindrical cables when said connecting body member is in its equilibrium configuration prior to said tab being inserted into said aperture;

said cylindrical member defining a second diameter larger than the outer diameter of said cylindrical cables when said tab is inserted into said aperture, at which time the connector is adapted to receive said cylindrical cables in end-to-end engagement within said hollow interior;

said connecting body member defining a third, in-use, inner diameter, generally equal to the outer diameter of said cylindrical cables after said tab is removed from said aperture, whereby the resiliency of said connecting body member causes said body member to further coil and clamp firmly about said cylindrical cables, said connector maintaining said third diameter for continuous clamping of said cylindrical cables.

* * * * *